United States Patent [19]

Leonard

[11] Patent Number: 4,811,706

[45] Date of Patent: Mar. 14, 1989

[54] PRESSURIZED BALANCED SEALING SYSTEM FOR USE ON THE RING-LINER INTERFACE OF A COAL FIRED DIESEL ENGINE

[75] Inventor: Gary L. Leonard, Schenectady, N.Y.

[73] Assignee: General Electric Company, Schenectady, N.Y.

[21] Appl. No.: 158,433

[22] Filed: Feb. 22, 1988

[51] Int. Cl.$^4$ ............................................. F01M 1/00
[52] U.S. Cl. ............................ 123/196 R; 123/193 P; 184/6.5
[58] Field of Search ...................... 123/196 R, 193 P; 184/6.5

[56] References Cited

U.S. PATENT DOCUMENTS

| | | | |
|---|---|---|---|
| 1,184,495 | 5/1916 | Sparks | 123/196 R |
| 4,519,206 | 5/1985 | van Michaels | 60/39.54 |

Primary Examiner—E. Rollins Cross
Attorney, Agent, or Firm—William H. Steinberg; James C. Davis, Jr.; Paul R. Webb, II

[57] ABSTRACT

Wear is minimized in a reciprocating internal combustion engine operated by fuel with abrasive particles, such as coal based fuel. A flexible diaphragm is used to equalize pressure in a ring pack area having lubricating film with the combustion chamber pressure. This equalization of pressure minimizes the pressure differential which might occur across an oil scraper ring separating the combustion chamber from the ring pack area. This minimizing of the pressure differential prevents or minimizes the passage of abrasive particles behind the oil scraper ring. A second ring, further from the combustion chamber end of the piston than is the oil scraper ring, serves as a high pressure sealing ring and separates the ring pack area from an oil blowby chamber. The second ring provides a predetermined amount of blowby from the ring pack area into the blowby chamber, which is also bounded by a third ring. In order to remove abrasive particles which may get into the ring pack area by deposition on the exposed areas of the cylinder wall, a pump and filter are used to draw in oil from the oil blowby chamber when the piston is in its bottom dead center position and to supply clean oil to the ring pack area.

24 Claims, 2 Drawing Sheets

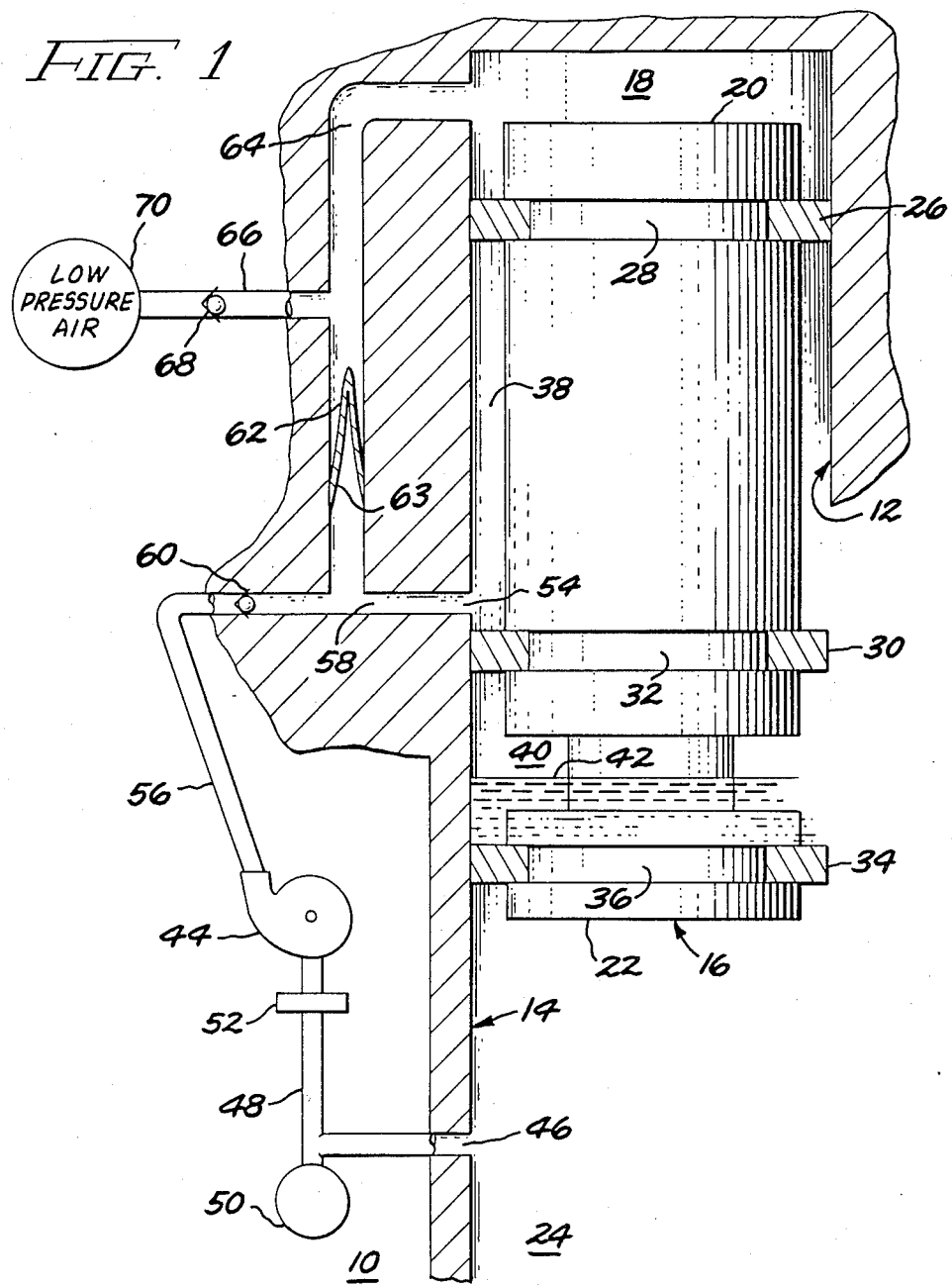

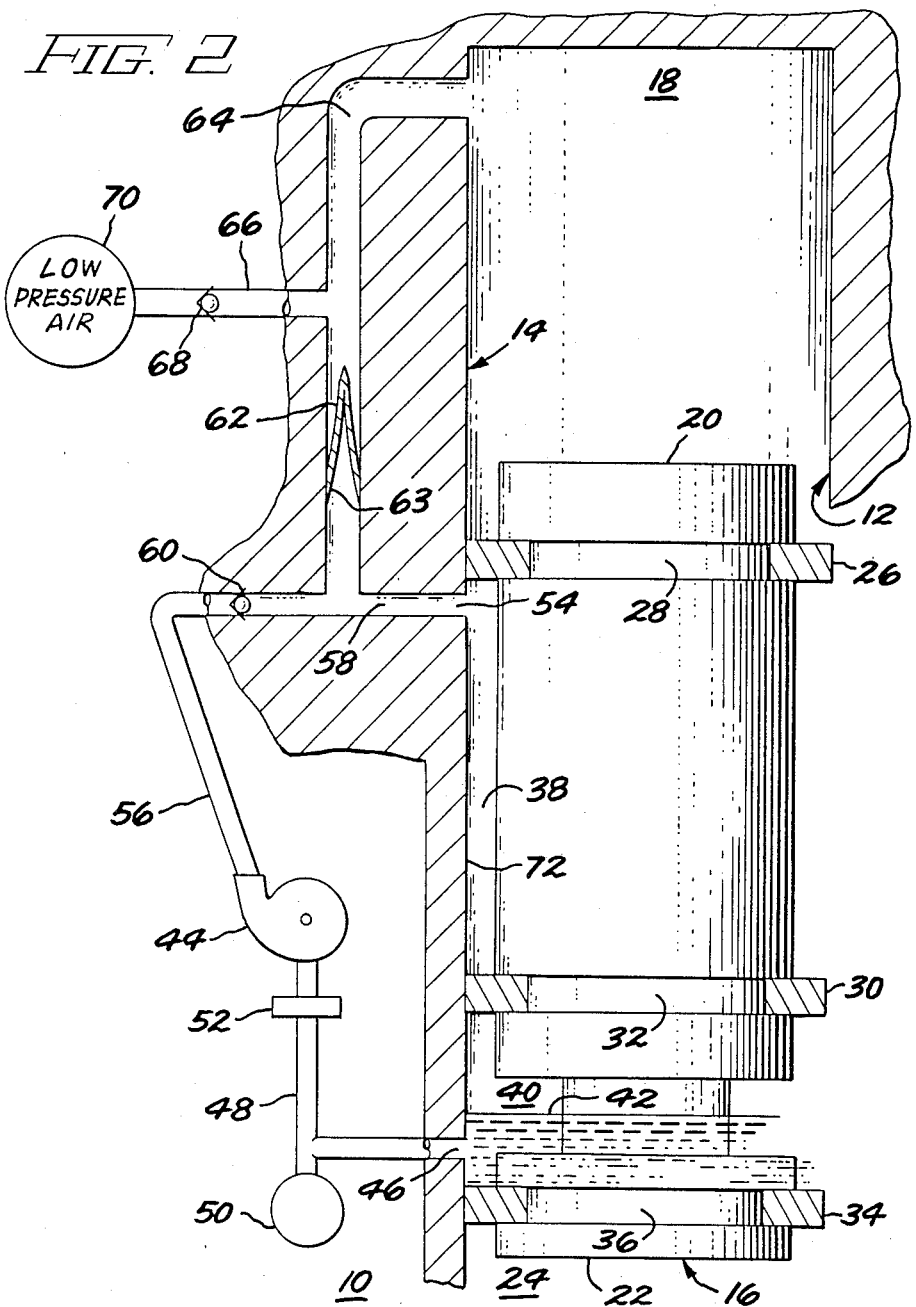

PRESSURIZED BALANCED SEALING SYSTEM FOR USE ON THE RING-LINER INTERFACE OF A COAL FIRED DIESEL ENGINE

BACKGROUND OF THE INVENTION

This invention relates to a system for minimizing wear to an engine. More particularly, this invention relates to a sealing system to protect against wear in the ring-liner of an engine.

Internal combustion engines of various types have been in common use for years. Such engines generally include a cylinder having a combustion chamber. The combustion of fuel within the combustion chamber is used to propel a piston within the cylinder.

Although such internal combustion engines have been quite useful, they have been subject to a number of problems. One common problem is wear on the ring-liner interface. The piston has rings which are designed to isolate the combustion chamber at one end of the piston from crankcase lubricant at the other end of the piston. The rings are designed to maintain the seal under harsh temperature and pressure conditions and when the cylinder wall (which may have a liner) is distorted. In view of the harsh conditions, it is not surprising that problems often develop with the ring-liner interface.

The extent of wear and likely maintenance problems in the ring-liner interface of an internal combustion engine may vary significantly. For a coal fired diesel engine, the problem is especially severe because coal leaves abrasive particles deposited on the liner of the cylinder wall and in the lubricating oil film on the liner. Accordingly, the particles of ash or other abrasive particles serve to greatly increase the wear caused by the piston moving within the cylinder. In fact, this problem of wear is a significant problem with coal fired diesel engines.

OBJECTS AND SUMMARY OF THE INVENTION

Accordingly, it is a primary object of the present invention to provide a new and improved system for minimizing wear to a reciprocating internal combustion engine.

A more specific object of the present invention is to provide such a system which is especially well suited for preventing abrasive particles from wearing down components of a coal fired diesel engine.

Yet another object of the present invention is to provide such a system which keeps abrasive particles out of the lubricant in the engine crankcase.

The above and other objects of the present invention are realized by a system for minimizing wear to a reciprocating internal combustion engine. The system includes a cylinder having a wall and a combustion chamber in the cylinder. A piston is movable in a stroke within the cylinder between a top dead center position and a bottom dead center position. The piston has first and second ends, the first end being adjacent to the combustion chamber and the second end being remote from the combustion chamber. First, second, and third piston rings extend around the piston. The first piston ring is closest to the first end, whereas the third piston ring is furthest from the first end of the piston and the second piston ring is intermediate to the first and third piston rings. A ring pack area on the piston is disposed between the first ring and the second ring, whereas a lubricant blowby area such as chamber is disposed between the second ring and the third ring. A pump having an inlet in the wall of the cylinder is arranged such that the lubricant blowby chamber registers with the inlet during at least part of the stroke of the piston. The pump has an outlet in the wall such that the lubricant pack area registers with the outlet during at least part of the stroke of the piston.

Significantly, the pump draws lubricant from the lubricant blowby chamber and provides lubricant to the lubricant pack area. Since the lubricant in the blowby chamber is lubricant which has been allowed to blowby the second ring and pass from the ring pack area into the lubricant blowby chamber, the pump effectively recirculates lubricant. A filter is connected to the pump such that the lubricant which is recirculated is cleaned to remove abrasive particles, thereby minimizing wear on the ring-liner interface.

In addition to using lubricant together with the pump and filter to clean the portion of the liner which is subjected to ash deposition, the arrangement uses a pressure member, preferably a flexible diaphragm, so as to communicate pressure from the combustion chamber to the lubricant within the ring pack area. The pressure member acts on the lubricant within a pressure conduit which communicates with the lubricant pack area over at least part of the stroke of the piston.

The internal combustion engine is preferably a coal fired diesel engine.

BRIEF DESCRIPTION OF THE DRAWINGS

The above and other features and objects of the present invention will become more apparent when the following detailed description is considered in conjunction with the accompanying drawings wherein like characters represent like parts throughout the several views and in which:

FIG. 1 is a side view of the present system showing a piston in top dead center position with some parts only partially shown and/or shown in cross section and other parts schematically represented; and FIG. 2 is a side view of the present system as with FIG. 1 except that the piston is in bottom dead center position.

DETAILED DESCRIPTION

The system 10 of the present invention is shown in simplified form in FIG. 1. As will be discussed in detail below, the system 10 is used to minimize the wear in a cylinder 12 having a cylindrical wall 14 and in which a piston 16 reciprocates between an upper (top dead center) position shown in FIG. 1 and a lower (bottom dead center) position shown in FIG. 2. Cylinder 12 and wall 14 are only partially shown. The piston is propelled downward by diesel combustion of fuel within combustion chamber 18. The present system 10 is especially applicable to minimizing wear on the cylindrical wall 14 which might occur when the fuel contains abrasives. As such, the invention is especially applicable to fuel derived from coal, although heavy oil or other fuel leaving significant abrasives such as ash could also be used. The present invention could indeed be used with any type of fuel.

The piston 16 has a first end 20 adjacent the combustion chamber 18 and a second end 22 adjacent a crankcase oil chamber 24. To avoid obscuring the present invention, various well known ports which would communicate with the combustion chamber 18 and various other parts, such as a piston rod which would connect to piston 16, are not shown in FIG. 1. It will also be readily appreciated that the cylinder 16 would usually be part of a multiple cylinder engine having a crankshaft (not shown) moved by a plurality of cylinders. As the ports and connection between the cylinder 16 and a crankshaft are relatively well known, these and other well known features are not central to the present invention and need not be discussed in detail. In similar fashion, the cylindrical wall 14 of cylinder 12 might include a liner, but this need not be separately shown as it is a relatively common feature.

Extending around the piston 16 adjacent to the first end 20 is a first ring. As shown, the first ring 26 is seated in a corresponding groove 28 which extends circumferentially around the piston 16. In similar fashion, a second ring 30 extends around the piston 16 and is seated in a groove 32. A third ring 34, seated within groove 36, extends around the piston 16.

Various types of piston rings could be used for the rings 26, 30 and 34. Preferably, the piston ring 26 is a closed loop type of ring, whereas the rings 30 and 34 might be the more common type of piston ring which has two split ends such that the ring can more easily adapt to variations in the cylinder wall. Indeed, the ring 30, which will serve as a high pressure sealing ring as discussed in detail below, may include a predetermined gap between the two split ends to allow a given amount of oil to flow from above the ring 30 to below the ring 30 as will be discussed in detail below.

As shown, the second ring 30 is further from the first end 20 than the first ring 26 is. In similar fashion, the third ring 34 is further still from the first end 20. The space between the first ring 26 and second ring 30 is a ring pack area 38. This ring pack area 38 is a cylindrical zone bounded by the first ring 26, second ring 30, piston 16, and cylindrical wall 14 and in which lubricating oil (not separately shown) would be disposed to minimize wear from the movement of the piston 16 relative to the cylinder 12.

A lubricant blowby area or zone comprises a chamber 40 which is disposed between the second ring 30 and the third ring 34. The lubricant blowby area may be recessed in piston 16 as shown for chamber 40, but this is not necessarily required. The chamber 40, which may extend cylindrically around the piston 16, is shown with oil 42 (or other lubricant) disposed therein. For clarity of illustration, the oil 42 is only shown on the left side of piston 16, it being readily understood that the oil 42 would extend circumferentially around the piston 16.

A pump 44 is mounted outside of the inner cylinder wall 14. The pump 44 is connected to an inlet 46 in the cylinder wall 14 by way of a suction side conduit 48. A reservoir chamber 50 for insuring that the pump 44 does not pump air is disposed between the inlet 46 and pump 44. Additionally, a filter 52 is disposed between the inlet 46 and pump 44. The filter 52 is used to filter out particulate contaminants which might otherwise increase the wear between the piston 16 and cylinder 12.

The pressure side of the pump 44 is connected to an outlet 54 by way of a conduit 56 and a pressure conduit 58. The conduit 56 is separated from the pressure conduit 58 by a one-way check valve 60 which insures that high pressure within conduit 58 is not transmitted back to the pump 44. The conduit 56 and pressure conduit 58 together define a lubricant flow path which extends from the pump 44 to the outlet 54 and is used to provide oil to the ring pack area 38.

A flexible membrane 62 is mounted in a communicating passage 64 such that the membrane 62 is subject to the pressure of the combustion chamber 18. The flexible diaphragm 62 is preferably a thin membrane with a circular outer periphery 63 which is secured to the cylindrical wall of passage 64 by any mechanical clamping or trapping arrangement (not shown) commonly used to secure an O ring. The diaphragm which has the same cross section in any plane taken along one of its diameters, is made of fibrous cloth impregnated with rubber. The cloth may be nylon, rayon, glass ceramic, or other material commonly used for providing a flexible diaphragm. The communicating passage 64 has an air passage 66 connected to it. The air passage 66 has a check valve 68 disposed therein and is connected to a low pressure air source 70 shown schematically. The low pressure air source 70 provides for the flow of low pressure air into the communicating passage 64 and the combustion chamber 18 when the chamber 18 has a lower pressure than the source 70, thereby keeping passage 64 free of combustion product buildup.

Operation

The operation of the present system 10 will be discussed with reference first to the piston 16 having the top dead center position of FIG. 1 and then with reference to it having the bottom dead center position of FIG. 2.

In the position of FIG. 1, the piston 16 is at the upper end of its stroke and the ring pack area 38 is filled with a lubricating oil (not separately shown). Additionally, oil is disposed within the pressure conduit 58 and that portion of the communicating passage 64 disposed below the flexible diaphragm 62. The pressure within the combustion chamber 18 is transmitted through to the oil within pressure conduit 58 and ring pack area 38 by way of the movement such as compression of flexible diaphragm 62. Accordingly, the first ring 26, which serves as an oil scraper ring, need not provide for a high pressure seal. That is, the flexible diaphragm 62 will compress (not shown in the drawings) in response to high pressure within combustion chamber 18 so as to compress the oil in ring pack area 38. Accordingly, the pressure differential across the first ring 26 will be zero or minimal. The high pressure seal ring 30 allows a controlled amount of blowby of lubricant to pass into the lubricant blowby area or chamber 40 so as to pool as oil 42.

Upon combustion of fuel (not shown) such as coal based fuel within the combustion chamber 18, the balance between the pressures on opposite sides of the oil scraper ring 26 prevents or minimizes abrasive particles from blowing by the ring 26 into the ring pack area 38. Thus, the flexible diaphragm 62 serves as a pressure member to minimize the pressure differential across the ring 26 and, thereby, impede the access of the abrasive particles such as ash to the locations where by would be most damaging.

Following the movement of the piston 16 from its position in FIG. 1 to its bottom dead center position in FIG. 2, the ash or other abrasive particles (not shown) would be deposited upon the portion of cylinder wall 14 identified at 72 in FIG. 2 corresponding to the portion of cylinder wall 14 which is uncovered by the downward movement of the piston 16. When the piston 16 is at or near the bottom dead center position, the oil blowby chamber 40 communicates by coming into registry with the inlet 46. Accordingly, oil from the chamber 40 is drawn into chamber 50 and oil is filtered by filter 52 before the pump 44 pumps the cleaned oil into pressure conduit 58 by way of conduit 56. The recirculated oil passes into the ring pack area 38 so as to replace the oil which has blown by the ring 30 during the combustion. The outlet 54 preferably remains in registry with the ring pack area 38 throughout the stroke of piston 16.

As the piston 16 travels from the bottom dead center position of FIG. 2 back into the top dead center position of FIG. 1, the lubricating film of the oil in ring pack area 38 will clean off the abrasive particles which have been deposited on the exposed portion 72 of cylindrical wall 14. The abrasive particles which become entrained in the oil in ring pack area 38 will be filtered by filter 52, the pump 44 drawing a portion of the oil each time the piston 16 goes to its bottom dead center position of FIG. 2.

It will therefore be appreciated that the flexible diaphragm 62 serves to minimize the entry of abrasive particles into the ring pack area 38. Specifically, the flexible diaphragm 62 balances the pressure on both sides of ring 26 such that abrasive particles are less likely to blowby the ring 26. At the same time, the pump 44, filter 52, and associated conduits and/or passages allow cleaning and recirculation of the lubricant such as oil which picks up abrasive particles in order to clean the exposed portions 12 of cylindrical wall 14.

In operation, the first ring 26 serves as an oil scraper ring, the second ring 30 serves as a high pressure sealing ring, and the third ring 34 serves as an isolation ring to separate the lubricant in oil blowby chamber 40 from lubricant (not shown) which would be disposed in the crankcase chamber 24.

Note that the inlet 46 is above the oil (not shown) in the partially shown crankcase oil chamber, but the oil in reservoir 50 insures that it does not pump air to ring pack area 38.

For a multiple cylinder engine a single pump 44, single filter 52, and single reservoir 50 could be used with a separate pressure conduit 58 corresponding to each cylinder. In other words, each cylinder would have its own diaphragm 62 and conduit 58 connected to a common pump and isolated from the other cylinders by a check valve 62.

Although the preferred embodiment uses a single inlet 46 and a single outlet 54 for the piston 16, one could alternately use a plurality of circumferentially spaced inlets and/or outlets for a single piston. For example, such multiple outlets might be used to insure even oil distribution in ring pack area 38.

Although the passage 64 and conduit 58 have been shown as being embedded or cut out from the cylindrical wall 14, it will be readily appreciated that they might be realized by appropriate hoses suitable for the pressure.

Although various specific constructions have been described herein, it is to be understood that these are for illustrative purposes only. Various modifications and adaptations will be apparent to those of skill in the art. Accordingly, the scope of the present invention to be determined by reference to the claims appended hereto.

What is claimed is:

1. A system for minimizing wear to a reciprocating internal combustion engine comprising:
    a cylinder having a wall and a combustion chamber within the cylinder;
    a piston movable in a stroke within the cylinder between a top dead center position and a bottom dead center position, said piston having first and second ends, said first end being adjacent to said combustion chamber and said second end being remote from said combustion chamber;
    first, second, and third piston rings extending around said piston, said second piston ring being positioned between the first and the third piston rings;
    a ring pack area on said piston between said first piston ring and said second piston ring;
    a lubricant blowby area between said second piston ring and said third piston ring; and
    a pump communicating with an inlet in said wall such that said lubricant blowby area registers with said inlet during at least part of the stroke of the piston, said pump having an outlet in said wall such that said ring pack area registers with said outlet during at least part of the stroke of the piston, said pump operable to draw lubricant from said lubricant blowby area and provide lubricant to said ring pack area.

2. The system of claim 1 further comprising a one-way check valve between said pump and said outlet.

3. The system of claim 1 further comprising a filter for filtering lubricant between said inlet and said outlet.

4. The system of claim 1 wherein said first ring is an oil scraper ring, said second ring is a high pressure sealing ring, and said third ring separates lubricant in the lubricant blowby area from crankcase lubricant disposed adjacent said second end of said piston.

5. The system of claim 1 further comprising a pressure conduit communicating with said ring pack area during at least part of the stroke of the piston, and a pressure member responsive to combustion chamber pressure to pressurize said ring pack area by movement of said pressure member acting on lubricant within said pressure conduit, said pressure member operable to minimize pressure differential across said first ring.

6. The system of claim 5 wherein said pressure conduit is at least part of a lubricant flow path extending from said pump to said outlet.

7. The system of claim 6 wherein said pressure conduit is separated from said pump by a one-way check valve.

8. The system of claim 6 further comprising a communicating passage conveying pressure from said combustion chamber to said pressure member.

9. The system of claim 6 wherein said pressure member is a flexible diaphragm and wherein said combustion chamber is a coal fired diesel combustion chamber.

10. A system for minimizing wear to a reciprocating internal combustion engine comprising:
    a cylinder having a wall and a combustion chamber within the cylinder;
    a piston movable in a stroke within the cylinder between a top dead center position and a bottom dead center position, said piston having first and second ends, said first end being adjacent to said combustion chamber and said second end being remote from said combustion chamber;
    first piston rings extending around said piston;
    second piston rings extending around said piston, the space between said second piston ring and said first end being greater than the space between said first ring and said first end;
    a ring pack area on said piston between said first ring and said second ring;

a pressure conduit communicating with said ring pack area during at least part of the stroke of the piston; and a pressure member responsive to the combustion chamber pressure to pressurize said ring pack area by movement of said pressure member acting on lubricant within said pressure conduit.

11. The system of claim 10 wherein said pressure member is a flexible diaphragm operable to minimize pressure differential across said first ring.

12. The system of claim 11 wherein said combustion chamber is a coal fired diesel combustion chamber.

13. The system of claim 11 further comprising a communicating passage conveying pressure from said combustion chamber to said pressure member.

14. The system of claim 13 further comprising a third piston ring extending around said piston, the space between said third piston ring and said first end being greater than the space between said second ring and said first end, a lubricant blowby area between said second ring and said third ring, and a pump communicating with an inlet in said wall such that said lubricant blowby area registers with said inlet during at least part of the stroke of the piston, said pump having an outlet in said wall such that said ring pack area registers with said outlet during at least part of the stroke of the piston, said pump operable to draw lubricant from said lubricant blowby area and provide lubricant to said ring pack area.

15. The system of claim 14 wherein said first ring is an oil scraper ring, said second ring is a high pressure sealing ring, and said third ring separates lubricant in the lubricant blowby area from crankcase lubricant disposed adjacent said second end of said piston.

16. The system of claim 15 further comprising a filter for filtering lubricant between said inlet and said outlet.

17. A system for minimizing wear to a reciprocating combustion engine comprising: a cylinder having a wall and a combustion chamber therein;

a piston movable in a stroke within the cylinder between a top dead center position and a bottom dead center position, said piston having first and second ends, said first end being adjacent to said combustion chamber and said second end being remote from said combustion chamber; first piston rings extending around said piston; second piston rings extending around said piston, the space between said second piston ring and said first end being greater than the space between said first ring and said first end;

a ring pack area on said piston between said first ring and said second ring;

a pump communicating with an inlet in said wall and an outlet in said wall, said outlet disposed to register with said ring pack area during at least part of the stroke of said piston; and a filter connected to said pump; and wherein said pump is operable to recirculate lubricant to said ring pack area by way of said filter.

18. The system of claim 17 wherein said filter is disposed to filter lubricant as it moves from said inlet to said pump.

19. The system of claim 17 further comprising a third piston ring extending around said piston, the space between said third piston ring and said first end being greater than the space between said second ring and said first end, and a lubricant blowby area between said second ring and said third ring.

20. The system of claim 19 wherein said first ring is an oil scraper ring, said second ring is a high pressure sealing ring, and said third ring separates lubricant in the lubricant blowby area from crankcase lubricant disposed adjacent said second end of said piston.

21. The system of claim 20 further comprising a pressure conduit communicating with said ring pack area during at least part of the stroke of the piston, and a pressure member responsive to combustion chamber pressure to pressurize said ring pack area by movement of said pressure member acting on lubricant within said pressure conduit, said pressure member operable to minimize pressure differential across said first ring.

22. The system of claim 21 wherein said pressure conduit is at least part of a lubricant flow path extending from said pump to said outlet and wherein said pressure conduit is separated from said pump by a one-way check valve.

23. The system of claim 22 wherein said pressure member is a flexible diaphragm and wherein said combustion chamber is a coal fired diesel combustion chamber.

24. The system of claim 23 further comprising a communicating passage conveying pressure from said combustion chamber to said pressure member.

* * * * *